US007395195B2

(12) United States Patent
Suenbuel et al.

(10) Patent No.: US 7,395,195 B2
(45) Date of Patent: Jul. 1, 2008

(54) SENSOR NETWORK MODELING AND DEPLOYMENT

(75) Inventors: Asuman Suenbuel, San Jose, CA (US); Thomas Odenwald, Redwood City, CA (US); Brian S. Mo, Palo Alto, CA (US)

(73) Assignee: SAP Aktiengesellschaft (DE)

( * ) Notice: Subject to any disclaimer, the term of this patent is extended or adjusted under 35 U.S.C. 154(b) by 409 days.

(21) Appl. No.: 11/023,083

(22) Filed: Dec. 27, 2004

(65) Prior Publication Data

US 2006/0142978 A1      Jun. 29, 2006

(51) Int. Cl.
*G06F 17/50*    (2006.01)
(52) U.S. Cl. .............................. 703/13; 703/21; 700/31
(58) Field of Classification Search .................... 703/13, 703/21; 702/22; 700/99, 28, 29, 31
See application file for complete search history.

(56) References Cited

U.S. PATENT DOCUMENTS

| | | | |
|---|---|---|---|
| 6,839,636 B1 * | 1/2005 | Sunshine et al. ............... | 702/22 |
| 6,847,854 B2 * | 1/2005 | Discenzo ...................... | 700/99 |
| 6,996,478 B2 * | 2/2006 | Sunshine et al. ............... | 702/22 |
| 7,119,676 B1 * | 10/2006 | Silverstrim et al. .......... | 340/531 |
| 2003/0023534 A1 | 1/2003 | Kadambe ..................... | 705/36 |
| 2004/0049698 A1 | 3/2004 | Ott et al. | |
| 2004/0064260 A1 | 4/2004 | Padmanabhan et al. | |
| 2006/0034726 A1 * | 2/2006 | Sunshine et al. ............... | 422/58 |
| 2006/0075210 A1 * | 4/2006 | Manohar et al. ............... | 712/36 |
| 2006/0143439 A1 * | 6/2006 | Arumugam et al. ......... | 713/153 |
| 2006/0176169 A1 * | 8/2006 | Doolin et al. ............... | 340/521 |

OTHER PUBLICATIONS

"Ascent: Adaptive Self-Configuring sEnsor Networks Topologies", Cerpa et al, IEEE Transactions of Mobile Computing, vol. 3, No. 3, Jul. 2004.*
"Manna: A management Architecture for Wireless Sensor Networks", Ruiz et al, IEEE Communications Magazine, Feb. 2003.*
"Layout Optimization for a Wireless Sensor Network Using a Multi-Objective Genetic Algorithm", Jourdan et al, IEEE 0-7803-8255-2/04, IEEE 2004.*
"Cooperative Artefacts: Assessing Real World Situation with Embedded Technology", UbiComp 2004, LNCS 3205, pp. 250-267, 2004.*
"Integrating Wireless Sensor Netowrks with the Grid", IEEE Internet Computing, Jul. 2004.*
"Sensor Network: Evolution, Opportunities, and Challenges", Chong et al, Proceedings of IEEE, vol. 91, No. 8, Aug. 2003.*
Dhillon S S et al, "Sensor placement for grid coverage under imprecise detections", Information Fusion, 2002. Proceedings of the Fifth International Conference on Jul. 8-11, 2002, Piscataway, NJ, USA, IEEE vol. 2, Jul. 8, 2002, pp. 1581-1587.

* cited by examiner

*Primary Examiner*—Russell Frejd
(74) *Attorney, Agent, or Firm*—Fish & Richardson P.C.

(57) ABSTRACT

Methods and apparatus, including computer program products, for receiving constraint characterizing data applicable to a sensor network, receiving a logical representation of a requirements specification for the sensor network, and processing the constraint characterizing data and the logical representation of the requirements specification to generate a modular representation of the sensor network. The constraint characterizing data includes physical environment data, sensor constraint data, and application domain data. The modular representation of the sensor network defines sensor node placement and sensor distribution within the sensor network.

20 Claims, 3 Drawing Sheets

SENSOR NETWORK MODELING AND DEPLOYMENT

BACKGROUND

This description relates to sensor network modeling and deployment.

A sensor network is formed by a collection of sensor nodes that are linked by a wireless medium to perform distributed sensing tasks. Sensor networks are deployed in a variety of environments to perform tasks such as surveillance, widespread environmental sampling, security, and health monitoring.

SUMMARY

In general, in one aspect, the invention features a method including receiving constraint characterizing data applicable to a sensor network, receiving a logical representation of a requirements specification for the sensor network, and processing the constraint characterizing data and the logical representation of the requirements specification to generate a modular representation of the sensor network. The constraint characterizing data includes physical environment data, sensor constraint data, and application domain data. The modular representation of the sensor network defines sensor node placement and sensor distribution within the sensor network.

Implementations may include one or more of the following. The method includes generating items of code according to the modular representation of the sensor network. Each item of code is suitable for execution on a sensor node. The method includes sending each item of code to a corresponding sensor node. The method includes deploying sensor nodes in a physical environment characterized by the physical environment data. Each sensor node has a sensor node placement and one or more sensors as defined by the modular representation of the sensor network.

The method includes receiving user input specifying one or more sensor network factors; and generating the modular representation of the sensor network using the user-specified sensor network factors. The modular representation of the sensor network can be optimized according to the user-specified sensor network factors. The physical environment data can include data characterizing a physical environment in which the sensor network is to deployed and data characterizing limitations of the physical environment. The sensor constraint data can include data characterizing parameters of a sensor type and data characterizing parameters of a sensor node. The application domain data can include data characterizing an application domain in which the sensor network is to be deployed. The logical representation of the requirements specification can include one or more logical statements, each logical statement formed by a plurality of variables associated with each other through logical operators.

In general, in another aspect, the invention features a computer program product, tangibly embodied in an information carrier, the computer program product being operable to cause a machine to receive constraint characterizing data applicable to a sensor network, receive a logical representation of a requirements specification for the sensor network, and process the constraint characterizing data and the logical representation of the requirements specification to generate a modular representation of the sensor network. The constraint characterizing data includes physical environment data, sensor constraint data, and application domain data. The modular representation defines sensor node placement and sensor distribution within the sensor network.

Implementations may include one or more of the following. The computer program product is further operable to cause a machine to generate items of code according to the modular representation of the sensor network. Each item of code is suitable for execution on a sensor node. The computer program product is further operable to cause a machine to send each item of code to a corresponding sensor node. The computer program product is further operable to cause a machine to deploy sensor nodes in a physical environment characterized by the physical environment data. Each sensor node has a sensor node placement and one or more sensors as defined by the modular representation of the sensor network.

The computer program product is further operable to cause a machine to receive user input specifying one or more sensor network factors; and generate the modular representation of the sensor network using the user-specified sensor network factors. The computer program product is further operable to cause a machine to optimize the modular representation of the sensor network according to the user-specified sensor network factors. The computer program product is further operable to cause a machine to provide a graphical user interface through which user input is received.

In general, in another aspect, the invention features a system including a memory in which (1) a plurality of models are stored, the plurality of models including at least one physical environment model, at least one sensor constraint model, and at least one domain-specific model, and (2) a logical representation of a requirements specification for a sensor network is stored; and a processor to execute a program configured to retrieve a physical environment model, a sensor constraint model, a domain-specific model, and the logical representation of the requirements specification from memory; and process the models and the logical representation of the requirements specification to generate a modular representation of the sensor network, the modular representation defining sensor node placement and sensor distribution within the sensor network.

Implementations may include one or more of the following. The program is further configured to generate items of code according to the modular representation of the sensor network, each item of code being suitable for execution on a sensor node; and send each item of code to a corresponding sensor node. The program is further configured to receive user input specifying one or more sensor network factors; and generate the modular representation of the sensor network using the user-specified sensor network factors.

Advantages that can be seen in particular implementations of the invention include one or more of the following. The modeling tool enables a sensor network model to be generated via an automated process. The sensor network model can be tailored to account for a number of variables including but not limited to cost of deployment, maximum number of sensor nodes, maximum number of sensors of a particular type, power consumption per node, aggregate power consumption across the sensor network, and bandwidth efficiency. The sensor network model can be customized based on application domain and physical environment, and/or using a requirements specification for the sensor network to be deployed. The sensor network model can be translated, e.g., by an automatic code generator into items of executable code. Each item of executable code can loaded into the memory of a corresponding sensor node pre-deployment in the physical environment or post-deployment. Each sensor node is reprogrammable on-the-fly (i.e., the executable code in the memory can be changed on demand) thus allowing for changes to be made after the sensor network has been deployed. Such changes may be due to internal factors associated with the sensor network (e.g., sensor node outages) or external factors associated with the physical environment (e.g., climate control system failure) or the application domain (e.g., laws amended to require more stringent standards).

The details of one or more examples are set forth in the accompanying drawings and the description below. Further features, aspects, and advantages of the invention will become apparent from the description, the drawings, and the claims.

DETAILED DESCRIPTION

Figure 1A:
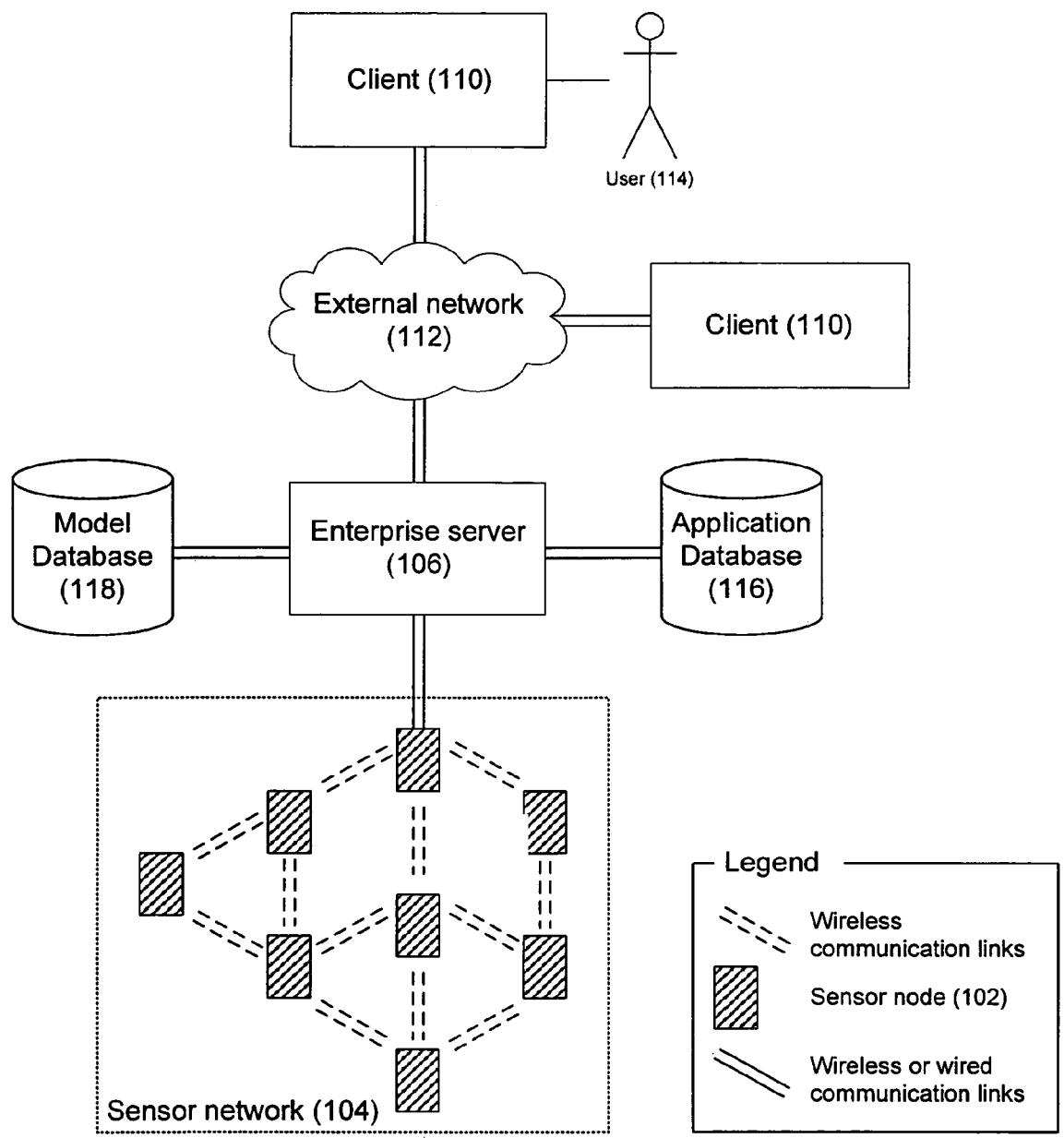
FIG. 1a is a block diagram of a system for monitoring an environment using a sensor network.
Figure 1B:
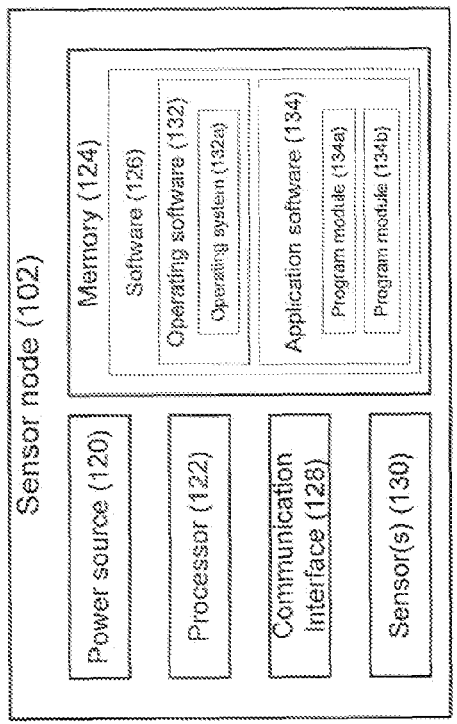
FIG. 1b is a block diagram of a sensor node.
Figure 1D:
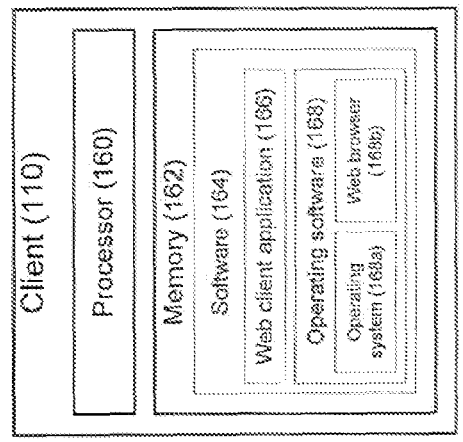
FIG. 1d is a block diagram of a client.
Figure 1C:
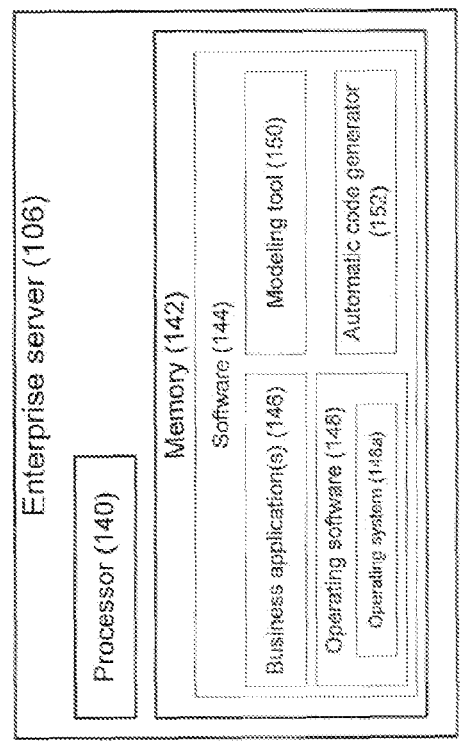
FIG. 1c is a block diagram of an enterprise server.

Referring to FIGS. 1a-1d, a distributed collection of sensor nodes 102 forms a sensor network 104 interconnected by wireless communications links (represented by double dashed lines). Each sensor node 102 senses and collects data samples from its physical environment. The sensor nodes 102 perform routing functions to create a multi-hop wireless networking fabric that relays data samples to an enterprise server 106. The enterprise server 106 receives the information gathered by the sensor network 104, performs additional processing (if necessary), and delivers the information to one or more clients 110 over an external network 112. Through a user interface provided at the client 110, a user 114 may interact with the sensor network 104 by, e.g., viewing the activity of the sensor nodes 102 at a node-level or a network-level, determining the health status (e.g., battery level) of individual sensor nodes 102, issuing commands to set sensor sensitivity thresholds of the sensor nodes 102 or reprogram individual sensor nodes 102, to name a few.

Each sensor node 102 is an electronic device having processing, sensing, and communication capability. Each sensor node 102 includes a power source 120 (e.g., a battery), one or more processors (referred to herein as "processor 122"), a memory 124 for storing software 126, a communication interface 128, and one or more sensors 130. The communication interfaces 128 of sensor nodes that are not directly connected to the enterprise server 106 typically only include a wireless component (e.g., an antenna). For sensor nodes 102 that serve as gateways between the sensor network 104 and the enterprise server 106, the communication interface 128 includes both a wireless component and a wired component (e.g., Ethernet jack).

The processor 122 of a sensor node 102 executes the software 126, which includes operating software 132 and application software 134. The operating software 132 includes an operating system 132a, such as TinyOS (developed at the University of California, Berkeley). The application software 134 includes one or more program modules 134a, 134b, Each program module 134a, 134b includes executable code that is either loaded into memory 124 prior to deployment of the sensor node, or received over the wireless communication links post-deployment. Such post-deployment programming enables a sensor node 102 embedded in the environment to be programmed (or reprogrammed) on-the-fly, thus providing for application upgrades or changes, and in some cases, recovery from program-induced crashes or failures, e.g., through remote rebooting.

Each sensor node 102 includes one or more sensors 130 for detecting different environmental conditions including, but not limited to, acceleration, vibration, temperature, sound and light, movement and proximity to other sensor nodes 102. The sensed raw data resulting from the detection can be processed and analyzed autonomously or in cooperation with neighboring sensor nodes 102 to generate filtered sensor readings. The filtered sensor readings are then passed from sensor node to sensor node on a multi-hop route to the enterprise server 106. Communicating filtered sensor readings rather than a continuous stream of raw data between the sensor nodes 102 reduces the power required to convey information within the sensor network 104.

The enterprise server 106 may be any type of computing device including a processor 140 and memory 142 that stores software 144. The processor 140 executes software 144, which includes one or more business applications 146 and operating software 148. The operating software 148 includes, but is not limited to, an operating system 148a and one or more routines for effecting communication over the external network 112. In one example, the enterprise server 106 is an SAP Web Application Server 106 running mySAP Product Lifecycle Management ("PLM") business application software 146, both available from SAP AG of Walldorf (Baden) Germany. The mySAP PLM business application 146 can be used for life-cycle data management, program and product management, life-cycle collaboration, quality management, asset life-cycle management, and environment, health and safety management.

Data associated with the business application 146 is stored in an application database 116 accessible by the enterprise server 106. Although only one application database 116 is shown in FIG. 1a, the depicted single application database 116 represents any physical or virtual, centralized or distributed database suitable for the receipt and storage of files. Each file is an entity of data, i.e., a string of bytes that is capable of being manipulated as an entity. The files can represent any kind of information, such as text, images, executables, or simply binary data.

The external network 112 may be comprised of one or more networks, such as wide area networks ("WANs"), LANs, wireless networks, and the like, which may or may not be linked by the Internet. The external network 112 runs transmission control protocol/internet protocol ("TCP/IP") or another suitable protocol. Network connections may be via Ethernet, telephone line, wireless, or other transmission media.

Each client 110 may be any type of Web-enabled apparatus or system. Examples of such apparatuses or systems include, but are not limited to, a desktop computer, a laptop computer, a mainframe computer, a cellular telephone, a personal digital assistant ("PDA"), and a controller embedded in an otherwise non-computing device. The client 110 contains one or more processor(s) 160 (referred to simply as "processor 160") and memory 162 for storing software 164. The processor 160 executes software 164, which includes a Web client application 166 and operating software 168. The Web client application 166 includes one or more routines used in implementing the TCP/IP protocol, which allows the client 110 to communicate over the external network 112. The operating software 168 may include an operating system 168a, such as Windows XP®, a Web browser 168b, such as Internet Explorer®, and various application programs.

Although sensor networks 104 can be used in a wide variety of application domains including geophysical monitoring, precision agriculture, habitat monitoring, condition-based equipment maintenance, supply chain management, asset tracking, and healthcare monitoring, a deployed sensor network 104 typically targets a single application domain and is tailored to the domain's needs.

In one example scenario, a chemical manufacturing company handles hundreds of different raw materials and manufactures thousands of end products. The company uses the environment, health, and safety ("EH&S") management capability of the mySAP PLM application 146 to provide an enterprise solution that enables the company to manage its EH&S processes globally while ensuring that the requirements of EH&S laws and regulations are continually updated and satisfied by company procedures.

The company maintains an application database 116 that includes information, for each raw material and/or end product, such as composition, physical data (melting point, boiling point, flash point etc.), toxicity, health effects, first aid, reactivity, storage, disposal, protective equipment, and spill/leak procedures. The information in the application database 116 can be updated to reflect changes in the law and the mySAP PLM application 146 maintains a log of such changes for record keeping purposes. Environmental protection and work safety data can be made available across the company, and comprehensive search and output functions help employees to find information quickly and easily. Furthermore, material data sheets can be easily generated from the data stored in the application database 116. Such material data sheets provide both workers and emergency personnel with the proper procedures for handling or working with a particular substance.

The information stored in the application database 116 can also be used to aid the company in deploying a sensor network 104 that monitors EH&S issues, e.g., within a storage facility for storing chemical drums containing the raw materials and/or end products. In one implementation, the enterprise server 106 includes a modeling tool 150 for generating a sensor network model that identifies sensor node placement for reliable and efficient collection of sensor readings that may subsequently be processed by the mySAP PLM application 146 to determine, e.g., whether a dangerous situation exists within the storage facility. In this manner, the enterprise server 106 provides an infrastructure that supports a seamless integration of data (in the form of raw or filtered sensor readings) from a deployed sensor network 104 with business applications, such as the mySAP PLM application 146.

Once the sensor network model is generated and approved by the company, a "blueprint" of the sensor network model, specifying the sensor-type and location of each sensor node 102 to be deployed in the storage facility, can be provided to company personnel. The company personnel may then affix sensor nodes 102 to physical objects in the storage facility according to the blueprint. The physical objects may be in fixed locations (e.g., shelving units, handrails) or portable (e.g., chemical drums). The program modules 134a, 134b of each sensor node 102 includes executable code that is provided by the enterprise server 106 pre-deployment or post-deployment as previously described.

Figure 2:
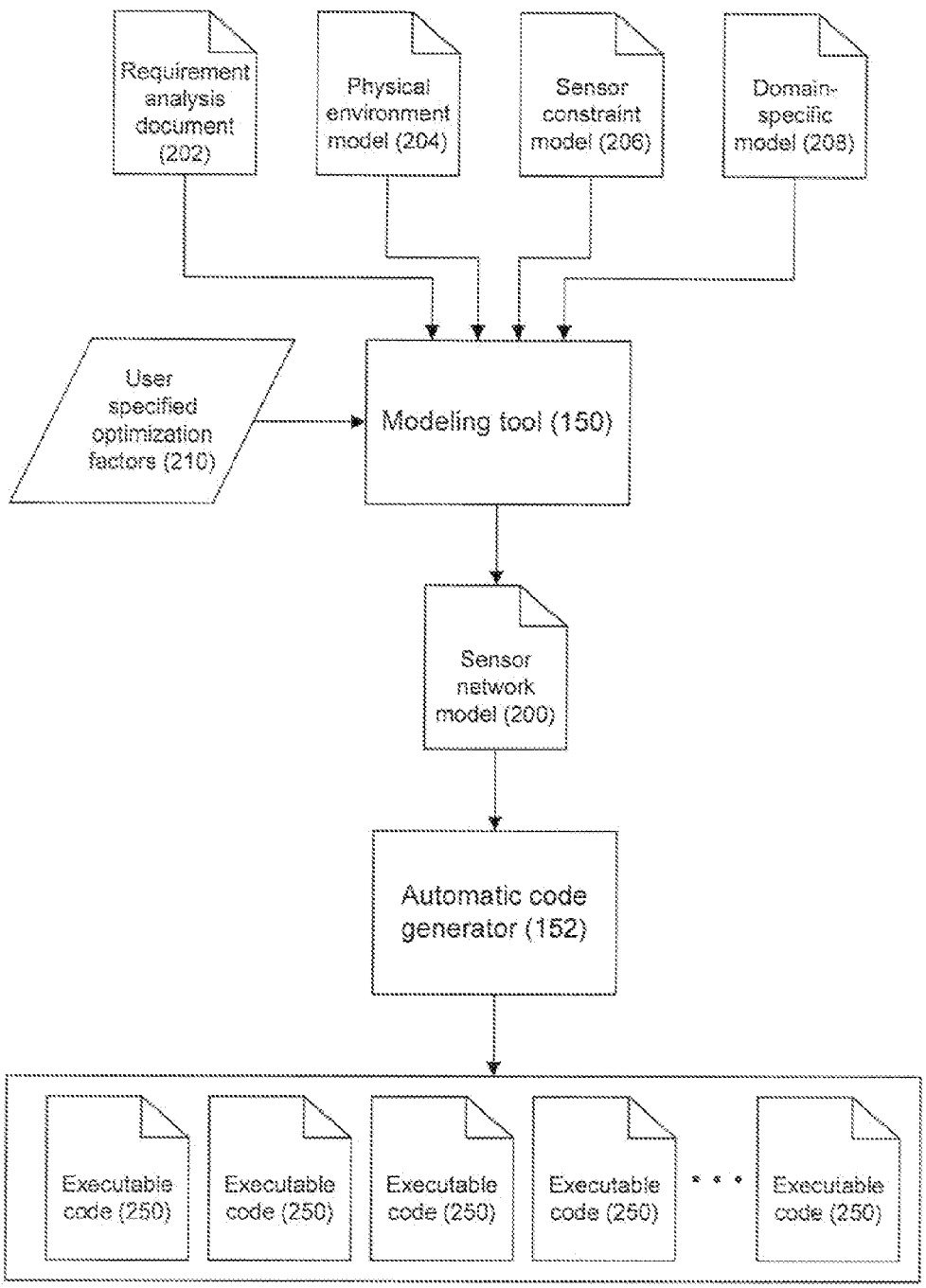
FIG. 2 shows a process for sensor node modeling and deployment.

As shown in FIG. 2, to generate a sensor network model 200, the modeling tool 150 takes an input a requirement analysis document 202, a physical environment model 204, a sensor constraint model 206, and a domain-specific model 208. Each of the models (i.e., the physical environment model 204, the sensor constraint model 206, and the domain-specific model 208) can be pre-built and stored (typically as code in a single file) in a model database 118 for subsequent retrieval by the modeling tool 150. Alternatively, one or more of the models 204-208 can be built by the modeling tool 150 using information provided by a user 114 and/or retrieved from the application database 116. For example, the modeling tool 150 can retrieve information about the raw materials and end products (e.g., composition, physical data, toxicity, and reactivity) as well as laws and regulations governing EH&S issues in a particular country to generate the domain-specific model 208.

Typically, company personnel prepare a requirement analysis document 202 during the early stages of a sensor network deployment life cycle. The requirement analysis document 202 states, in business terms, the needs or objectives of the company that are to be satisfied by deploying a sensor network deployment in the storage facility. Generally, the requirement analysis document 202 includes a collection of requirements expressed in the form of "shall" statements. Each "shall" statement represents a unique and specific requirement that the deployed sensor network will be measured against to ensure conformity to the requirements. An example of a "shall" statement in the storage facility scenario is: "The deployed sensor network shall ensure that EH&S laws and regulations are satisfied." Another example is: "The deployed sensor network shall ensure that company personnel are alerted when a dangerous situation is detected." The "shall" statements essentially function as a task list that specifies the deliverables that would render the deployed sensor network as successful from the company's perspective. A user 114 interacting with the modeling tool 150 can translate the "shall" statements provided in the requirement analysis document 202 to a logical format that is parsable into programming code. In one example, the user translates the "shall" statements into logical statements, each formed by a plurality of variables associated with each other through logical operators. In this manner, a logical representation of the requirement analysis document 202 is generated and may subsequently be used by the modeling tool 150.

A physical environment model 204 defines a physical space in which the sensor network 104 is to be deployed. The physical environment model 204 is used by the modeling tool 150 to identify the physical constraints of the storage facility that have to be accounted for in order to generate an effective sensor network 104. In the example scenario, the physical environment model 204 provides a description (e.g., text and/or graphical) of a storage facility in terms of building construction (e.g., concrete and marble used for exterior walls, drywall for interior walls, concrete slab for floors, open concrete ceilings with exposed pipes, and concrete columns), storage space (e.g., four separate floor spaces, each approximately 10,000 sq ft in size), interior configuration (e.g., location of columns or interior walls, steps, ramps, and built-in shelving units), load capacity floor limitations, and climate control/ventilation/electrical/sprinkler system(s), to name a few.

A sensor constraint model 206 defines constraints that apply at an individual sensor node-level or at a sensor network-level. The sensor constraint model 206 is used by the modeling tool 150 to identify physical, functional and/or operational constraints with respect to the sensors that have to be accounted for in order to generate an effective sensor network 104. In the example scenario, the sensor constraint model 206 accounts for constraints that apply uniformly to all sensor nodes 102 (e.g., battery power, processing capability, memory size, signal range, and network bandwidth), constraints that are sensor-type specific (e.g., the sensing coverage of a temperature sensor as compared to the sensing coverage of a humidity sensor, the directional parameters of a camera sensor), as well as constraints that are network-specific (e.g., arrangement of sensor nodes to provide reliable communication in the event of node outages)

A domain-specific model 208 describes rules that enable a sensor network 104 to be tailored to a specific application domain (e.g., monitoring a storage facility for storing chemical drums as compared to monitoring a storage facility for storing documents). In the example scenario, the domain-specific model 208 includes a set of storage rules regarding storage capacity, storage conditions, and incompatible goods. An example storage capacity rule requires no more than fifty chemical drums be stored within any one hundred square meter area of the storage area. An example storage condition rule requires certain chemical drums to be stored according to a certain temperature or humidity requirements. The incompatible goods rules dictate that certain chemicals that are particularly reactive with each other should not be stored in proximity with each other. The domain-specific model 208 may provide other types and sets of rules.

In one implementation, prior to generating the sensor network model, the modeling tool 150 provides a graphical user interface through which a user 114 selects one or more sensor network factors 210, e.g., cost, maximum number of sensor nodes, maximum number of sensors of a particular type, power consumption per node, aggregate power consumption across the sensor network, and bandwidth efficiency. The modeling tool 150 then takes as input the requirement analysis document 202, the physical environment model 204, the sensor constraint model 206, and the domain-specific model 208, and generates a sensor network model 200 that is optimized based on the user-specified factor(s) 210. In one example sensor network model 200, each sensor node 102 to be deployed in the storage facility is represented in the sensor network model 200 by information including, but not limited to location coordinates and sensor-types.

Once the sensor network model 200 has been generated and approved by the company, the sensor nodes 102 are deployed in the storage facility based on the sensor network model 200. In one implementation, the enterprise server 106 includes an automatic code generator 152 that translates the sensor network model 200 into items of executable code 250. Each item of executable code 250 is associated with a particular sensor node 102 in the sensor network model 200, and may be loaded into the memory 124 of that sensor node 102 pre-deployment or post-deployment.

Periodically, the modeling tool 150 receives updates from the sensor network 104 indicating that a change may need to be made within the deployed sensor network 104. For example, the modeling tool 150 may receive an alert from the sensor network 104 indicating one or more sensor node outages. In such a case, the modeling tool 150 determines whether the remaining sensor nodes 102 are capable of performing the sensing tasks of the sensor nodes that have failed, while satisfying, e.g., the EH&S laws and regulations. If so, no further action is taken. If, on the other hand, the modeling tool 150 determines that one or more of the EH&S laws and regulations are not satisfied as a result of the sensor node outages, a notification message is generated and sent to company personnel to notify them of the situation. Steps can then be taken to deploy a replacement sensor node 102.

The modeling tool 150 may also receive updates from the mySAP PLM business application 146 indicating that changes made to the application database 116 may affect the deployed sensor network 104. For example, the modeling tool 150 may receive an alert from the mySAP business application 146 indicating that certain EH&S laws and regulations have been made more stringent. In such a case, the modeling tool 150 determines whether additional sensor nodes need to be deployed in the sensor network in order to ensure that the EH&S laws and regulations are satisfied, and if so, the location coordinates and sensor type(s). Company personnel can then take steps to deploy the additional sensor nodes 102.

The techniques and all of the functional operations described in the attached documentation can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the techniques, can be performed by one or more programmable processors executing one or more computer programs to perform functions of the techniques by operating on input data and generating output. The processes and logic flows can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The techniques can be implemented in a computing system that includes a back-end component (e.g., a data server), a middleware component (e.g., an application server), or a front-end component (e.g., a client computer having a graphical user interface or a Web browser through which a user can interact with an implementation of the techniques), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A method comprising:
    receiving constraint characterizing data applicable to a sensor network, the constraint characterizing data comprising physical environment data, sensor constraint data, and application domain data;
    receiving a logical representation of a requirements specification for the sensor network; and
    processing the constraint characterizing data and the logical representation of the requirements specification to generate a modular representation of the sensor network, the modular representation defining sensor node placement and sensor distribution within the sensor network, the processing complying with a rule of a business application, and the sensor network being deployed in accordance with the modular representation;
    receiving an updated rule from the business application; and
    changing the modular representation of the sensor network based on the updated rule.

2. The method of claim 1, further comprising:
    generating items of code according to the modular representation of the sensor network, each item of code being suitable for execution on a sensor node.

3. The method of claim 2, further comprising:
    sending each item of code to a corresponding sensor node.

4. The method of claim 1, further comprising:
    deploying sensor nodes in a physical environment characterized by the physical environment data, each sensor node having a sensor node placement and one or more sensors as defined by the modular representation of the sensor network.

5. The method of claim 1, wherein the processing further comprises:
    receiving user input specifying one or more sensor network factors; and
    generating the modular representation of the sensor network using the user-specified sensor network factors.

6. The method of claim 5, wherein the modular representation of the sensor network is optimized according to the user-specified sensor network factors.

7. The method of claim 1, wherein the physical environment data comprises data characterizing a physical environment in which the sensor network is to be deployed and data characterizing limitations of the physical environment.

8. The method of claim 1, wherein the sensor constraint data comprises data characterizing parameters of a sensor type and data characterizing parameters of a sensor node.

9. The method of claim 1, wherein the application domain data comprises data characterizing an application domain in which the sensor network is to be deployed.

10. The method of claim 1, wherein the logical representation of the requirements specification comprises one or more logical statements, each logical statement formed by a plurality of variables associated with each other through logical operators.

11. A computer program product, tangibly stored on a machine-readable device, the computer program product, which when executed, is operable to cause a machine to:
    receive constraint characterizing data applicable to a sensor network, the constraint characterizing data comprising physical environment data, sensor constraint data, and application domain data;
    receive a logical representation of a requirements specification for the sensor network;
    process the constraint characterizing data and the logical representation of the requirements specification to generate a modular representation of the sensor network, the modular representation defining sensor node placement and sensor distribution within the sensor network, the processing complying with a rule of a business application, and the sensor network being deployed in accordance with the modular representation;
    receive an updated rule from the business application; and
    change the modular representation of the sensor network based on the updated rule.

12. The computer program product of claim 11, being further operable to cause a machine to:
    generate items of code according to the modular representation of the sensor network, each item of code being suitable for execution on a sensor node.

13. The computer program product of claim 12, being further operable to cause a machine to:
    send each item of code to a corresponding sensor node.

14. The computer program product of claim 11, being further operable to cause a machine to:
    deploy sensor nodes in a physical environment characterized by the physical environment data, each sensor node having a sensor node placement and one or more sensors as defined by the modular representation of the sensor network.

15. The computer program product of claim 11, being further operable to cause a machine to:
    receive user input specifying one or more sensor network factors; and
    generate the modular representation of the sensor network using the user-specified sensor network factors.

16. The computer program product of claim 15, being further operable to cause a machine to:
    optimize the modular representation of the sensor network according to the user-specified sensor network factors.

17. The computer program product of claim 15, being further operable to cause a machine to:
    provide a graphical user interface through which user input is received.

18. A system comprising:
    memory in which (1) a plurality of models are stored, the plurality of models comprising at least one physical environment model, at least one sensor constraint model, and at least one domain-specific model, and (2) a logical representation of a requirements specification for a sensor network is stored; and
    a processor to execute a program configured to:

retrieve a physical environment model, a sensor constraint model, a domain-specific model, and the logical representation of the requirements specification from memory;

process the models and the logical representation of the requirements specification to generate a modular representation of the sensor network, the modular representation defining sensor node placement and sensor distribution within the sensor network, the processing complying with a rule of a business application, and the sensor network being deployed in accordance with the modular representation;

receive an updated rule from the business application; and change the modular representation of the sensor network based on the updated rule.

19. The system of claim 18, wherein the program is further configured to:

generate items of code according to the modular representation of the sensor network, each item of code being suitable for execution on a sensor node; and send each item of code to a corresponding sensor node.

20. The system of claim 18, wherein the program is further configured to:

receive user input specifying one or more sensor network factors; and generate the modular representation of the sensor network using the user-specified sensor network factors.

* * * * *